US012803647B2

(12) United States Patent
Shinohara et al.

(10) Patent No.: US 12,803,647 B2
(45) Date of Patent: Nov. 17, 2026

(54) WIRELESS COMMUNICATION DEVICE, WIRELESS COMMUNICATION METHOD, AND WIRELESS COMMUNICATION SYSTEM

(71) Applicant: NTT, Inc., Tokyo (JP)

(72) Inventors: Shoko Shinohara, Musashino (JP); Yusuke Asai, Musashino (JP); Yoshitaka Shimizu, Musashino (JP); Junichi Iwatani, Musashino (JP); Tomoyuki Yamada, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 231 days.

(21) Appl. No.: 18/855,655

(22) PCT Filed: Apr. 14, 2022

(86) PCT No.: PCT/JP2022/017858
§ 371 (c)(1),
(2) Date: Oct. 10, 2024

(87) PCT Pub. No.: WO2023/199488
PCT Pub. Date: Oct. 19, 2023

(65) Prior Publication Data
US 2026/0189295 A1 Jul. 2, 2026

(51) Int. Cl.
*H04B 7/15* (2006.01)

(52) U.S. Cl.
CPC .................................... *H04B 7/15* (2013.01)

(58) Field of Classification Search
CPC ...... H04B 7/15; H04B 7/15542; H04W 72/04
See application file for complete search history.

(56) References Cited

U.S. PATENT DOCUMENTS

2007/0250876 A1* 10/2007 Odagawa ........... H04N 21/4667 725/89
2014/0355437 A1* 12/2014 Damodaran ........ H04W 28/082 370/232
2017/0238285 A1* 8/2017 Kalkunte ............. H04W 24/00 370/329

OTHER PUBLICATIONS

IEEE Standards Association, "Part 11: Wireless LAN Medium Access Control (MAC) and Physical Layer (PHY). Specifications Amendment 1: Enhancements for High-Efficiency WLAN", IEEE Computer Society, IEEE Std 802.11ax™-2021, Feb. 9, 2021, 767 pages.

* cited by examiner

*Primary Examiner* — Mohammad S Anwar
(74) *Attorney, Agent, or Firm* — XSENSUS LLP

(57) ABSTRACT

The wireless communication device includes a first wireless communication module that performs wireless communication with a master device belonging to a first communication group by switching a plurality of channels having no frequency overlapping area. The wireless communication device includes a second wireless communication module that performs wireless communication with a slave device belonging to a second communication group by switching the plurality of channels. The wireless communication device includes a control circuit that issues a command of a channel to be used for communication and a channel switching timing to the first and second wireless communication modules. The first and second wireless communication modules relay a packet between the master device and the slave device and, in response to the command, switch channels #1 and #2 in synchronization with each other.

8 Claims, 7 Drawing Sheets

WIRELESS COMMUNICATION DEVICE, WIRELESS COMMUNICATION METHOD, AND WIRELESS COMMUNICATION SYSTEM

CROSS-REFERENCE TO RELATED APPLICATION

The present application is based on PCT filing PCT/JP2022/017858, filed Apr. 14, 2022, the entire contents of which is incorporated herein by reference.

TECHNICAL FIELD

The present disclosure relates to a wireless communication device, a wireless communication method, and a wireless communication system, and relates to a wireless communication device, a wireless communication method, and a wireless communication system suitable for use in an environment in which a limitation of a transmission time can be alleviated by utilizing a plurality of channels.

BACKGROUND ART

For example, in Japan, a total transmission time is limited in use of the 920 MHz band. Specifically, in the frequency band, a transmission time of a wireless communication terminal is limited such that the total transmission time per hour is equal to or less than 360 seconds, that is, such that an upper limit of a duty ratio is 10%.

The above transmission limitation is a limitation for each channel, strictly speaking, in the example of Japan. One wireless communication terminal is allowed to perform transmission for up to 720 seconds by utilizing a plurality of channels. That is, it is possible to perform transmission with the duty ratio of substantially 20%. Note that it is necessary that the plurality of channels to be used do not have an overlapping area and that the total transmission time of the plurality of channels is equal to or less than 720 seconds and the transmission time of a single channel does not exceed 360 seconds.

A propagation range of a wireless signal using the 920 MHz band is wider than that of using the 2.4 GHz or 5 GHz band. Further, a communication area may be expanded by using a repeater because of the presence of a shielding object, for example. In that case, when a plurality of wireless communication modules is used in the repeater and each wireless communication module uses a different channel, it is possible to continuously maintain a relay function while avoiding interference between the wireless communication modules.

CITATION LIST

Non Patent Literature

Non Patent Literature 1: IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications

SUMMARY OF INVENTION

Technical Problem

Recently, IoT terminals have been widespread, and applications thereof have been diversified, and thus, in some usage examples, requirements cannot be satisfied only by conventional short-time communication. One example of them is video transmission of a monitoring camera in a wide area.

Under such a background, a case may be occur in which wireless signals are collected from a plurality of terminals to one repeater, and is required to the repeater to transfer all the wireless signals. In this case, the repeater is more strongly required to increase a communication capacity than other wireless communication terminals.

Because the limitation of the transmission time can be alleviated by utilizing a plurality of channels as described above, it is considered to cause the plurality of wireless communication modules included in the repeater to appropriately switch channels in order to increase the communication capacity. However, the number of available frequency channels is limited, and thus, if a plurality of wireless communication modules each independently selects and uses channels, it is difficult to efficiently use channels having less interference.

FIG. 1 shows a state in which two wireless communication modules NIC (network interface card or network interface controller)-1 and NIC-2 appropriately switch channels. As shown in FIG. 1, in a case where the wireless communication module NIC-1 uses a channel #1 and a channel #2, it is necessary that the channels do not have the overlapping area even partially in order to obtain the duty ratio of 20%. Similarly, in a case where the wireless communication module NIC-2 uses a channel #3 and a channel #4, it is necessary that the channels have completely no overlapping area.

The NIC-1 and the NIC-2 are arranged close to each other in a repeater, and thus it is necessary that channels whose use periods overlap with each other do not interfere with each other. Further, in a case where a timing of channel transition in the NIC-1 does not match with a timing of channel transition in the NIC-2, it is necessary to treat all channels used in the other channel as the channels whose use periods overlap. Therefore, in the example of FIG. 1, it is necessary that the channel #1 has no overlapping area with the channels #3 and #4 and that the channel #2 has no overlapping area with the channels #3 and #4. Therefore, in a case where a plurality of wireless communication modules independently performs channel transition, it is necessary to prepare four non-interference channels in total for the two wireless communication modules NIC-1 and NIC-2.

FIG. 2 shows an example where channels are set according to division of the 920 MHz band in Japan. More specifically, an upper part of FIG. 2 shows an example where a channel having a width of 1 MHz is set so as to generate no overlapping area in the 920 MHz band. A region having the width of 1 MHz extending from the sub ch 29 to the sub ch 33 is set as an NG region because the region extends over a "passive priority" region and an "active priority" region.

A lower part of FIG. 2 shows an example where a channel having the width of 2 MHz is set in the 920 MHz band and an example where a channel having the width of 4 MHz is set therein. A region having the width of 2 MHz extending from the sub ch 24 to the sub ch 33 is also set as the NG region because the region extends over the two regions, i.e., the "passive priority" region and the "active priority" region.

In the division of FIG. 2, up to two channels having the width of 2 MHz and only one channel having the width of 4 MHz can be prepared. That is, in order to prepare four independent channels having no overlapping area in the 920 MHz band, it is necessary to set the width of each channel to 1 MHz. In such a setting, a frequency width that is simultaneously utilized is only 2 MHz, and thus the wide frequency band of FIG. 2 cannot be sufficiently utilized.

The present disclosure has been made in view of the above problems, and a first object thereof is to provide a wireless communication device that appropriately controls transition timings of a plurality of channels such that a plurality of wireless communication modules arranged close to each other can sufficiently utilize a frequency band.

A second object of the present disclosure is to provide a wireless communication method for appropriately controlling transition timings of a plurality of channels such that a plurality of wireless communication modules arranged close to each other can sufficiently utilize a frequency band.

A third object of the present disclosure is to provide a wireless communication system capable of appropriately controlling transition timings of a plurality of channels such that a plurality of wireless communication modules arranged close to each other can sufficiently utilize a frequency band.

Solution to Problem

In order to achieve the above objects, a first aspect desirably includes:

a first wireless communication module that performs wireless communication with a communication device belonging to a first communication group by switching a plurality of channels having no frequency overlapping area;

a second wireless communication module that performs wireless communication with a communication device belonging to a second communication group by switching the plurality of channels; and a control circuit that issues a command to specify a channel to be used for communication and a channel switching timing to the first wireless communication module and the second wireless communication module, in which the first wireless communication module and the second wireless communication module perform processing of relaying a packet between the communication device belonging to the first communication group and the communication device belonging to the second communication group, and perform, in response to the command, processing of switching the channels in synchronization with each other, and processing of selecting channels to be used for communication such that channels to be simultaneously used have no overlapping area.

A second aspect is desirably a wireless communication method of causing a wireless communication device to relay communication between a communication device belonging to a first communication group and a communication device belonging to a second communication group, in which:

the wireless communication device includes a first wireless communication module that performs wireless communication with the communication device belonging to the first communication group by switching a plurality of channels having no frequency overlapping area, a second wireless communication module that performs wireless communication with the communication device belonging to the second communication group by switching the plurality of channels, and a control circuit that issues a command to specify a channel to be used for communication and a channel switching timing to the first wireless communication module and the second wireless communication module; and the first wireless communication module and the second wireless communication module perform a step of relaying a packet between the communication device belonging to the first communication group and the communication device belonging to the second communication group, a step of, in response to the command, switching the channels in synchronization with each other, and a step of, in response to the command, selecting channels to be used for communication such that channels to be simultaneously used have no overlapping area.

A third aspect is desirably a wireless communication system including a communication device belonging to a first communication group, a communication device belonging to a second communication group, and a wireless communication device that relays communication between the communication devices, in which:

the wireless communication device includes a first wireless communication module that performs wireless communication with the communication device belonging to the first communication group by switching a plurality of channels having no frequency overlapping area, a second wireless communication module that performs wireless communication with the communication device belonging to the second communication group by switching the plurality of channels, and a control circuit that issues a command to specify a channel to be used for communication and a channel switching timing to the first wireless communication module and the second wireless communication module; and the first wireless communication module and the second wireless communication module perform processing of relaying a packet between the communication device belonging to the first communication group and the communication device belonging to the second communication group, and perform, in response to the command, processing of switching the channels in synchronization with each other, and processing of selecting channels to be used for communication such that channels to be simultaneously used have no overlapping area.

Advantageous Effects of Invention

According to the first to third aspects, it is possible to use a wide channel by appropriately controlling a timing at which a plurality of wireless communication modules arranged close to each other transitions a channel. Therefore, according to the present aspects, it is possible to expand a communication capacity by efficiently using frequencies while appropriately avoiding interference between a plurality of wireless communication modules arranged adjacent to each other.

DESCRIPTION OF EMBODIMENTS

First Embodiment

Configuration of First Embodiment

Figure 3:
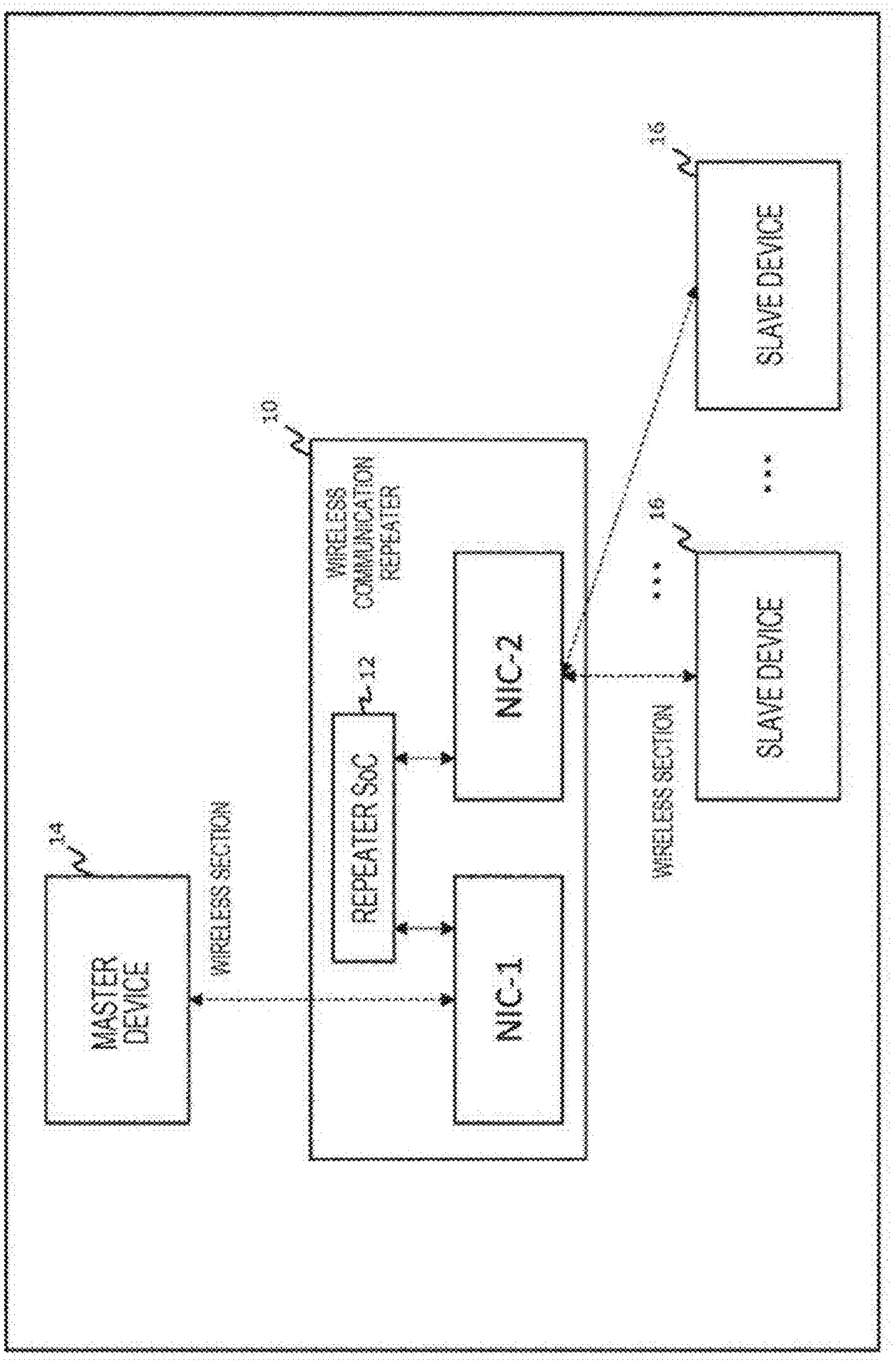
FIG. 3 is a block diagram showing a basic configuration of a wireless communication system in a first embodiment of the present disclosure.

FIG. 3 is a block diagram showing a basic configuration of a wireless communication system in a first embodiment of the present disclosure. As shown in FIG. 3, the wireless communication system of the present embodiment includes a wireless communication repeater 10. The wireless communication repeater 10 includes a repeater SoC (system on chip) 12. The repeater SoC 12 is an integrated circuit for exchanging packets between a first wireless communication module NIC-1 (hereinafter, simply referred to as the NIC-1) and a second wireless communication module NIC-2 (hereinafter, simply referred to as the NIC-2). The repeater SoC 12 includes various elements necessary for implementing the above functions, such as a processor and a memory.

The NIC-1 is a wireless communication module for performing wireless communication with a master device 14 of wireless communication. The NIC-2 is a wireless communication module for performing wireless communication with a slave device 16 of wireless communication. The wireless communication system of the present embodiment includes the master device 14 and the slave device 16 and may include a plurality of slave devices 16. The master device 14 and the slave device 16 are separated to such an extent that the devices cannot perform direct communication, but can communicate with each other by interposing the wireless communication repeater 10.

Figure 4:
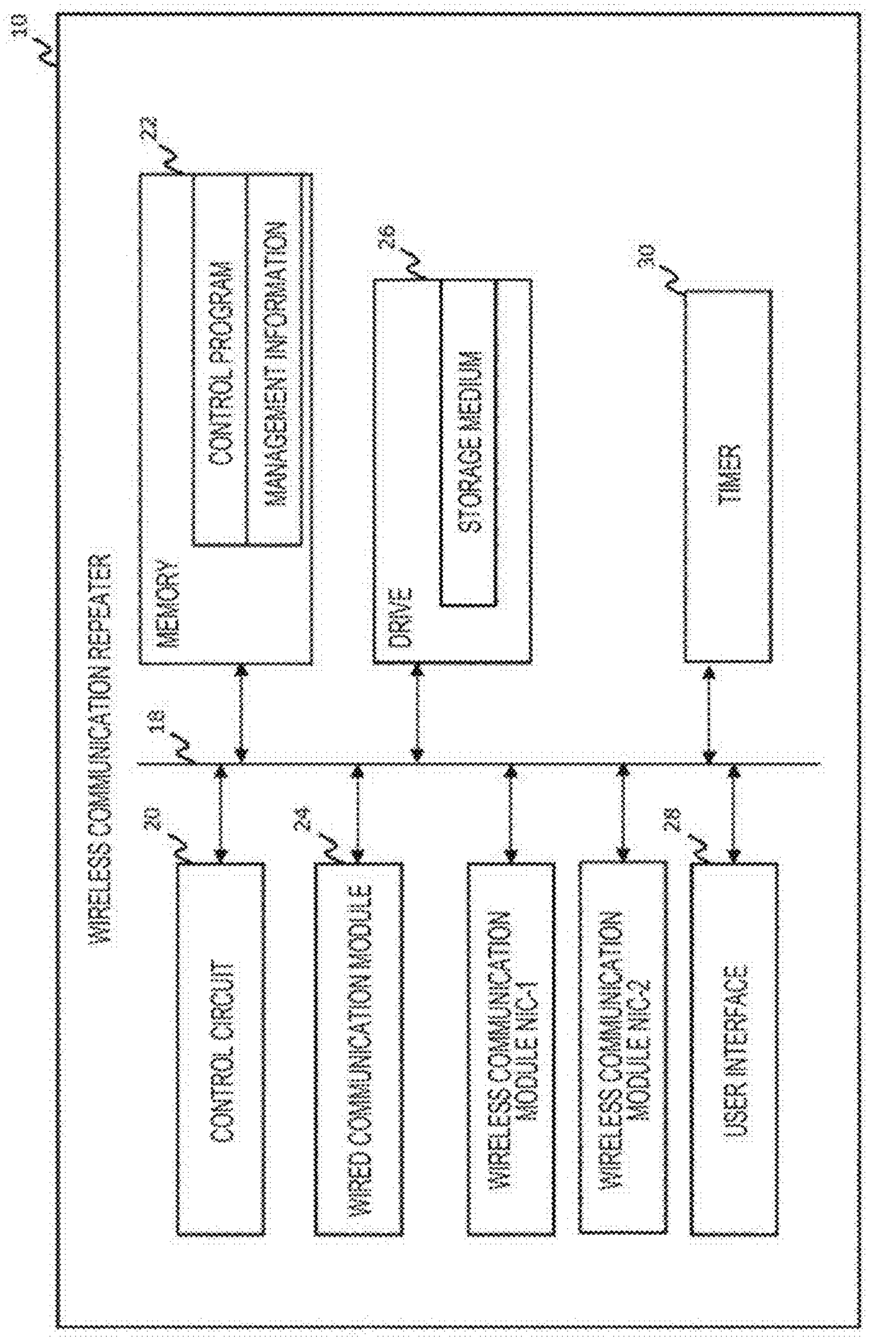
FIG. 4 is a block diagram showing a detailed configuration of a wireless communication repeater shown in FIG. 3.

FIG. 4 is a block diagram showing a configuration of the wireless communication repeater 10 in more detail. As shown in FIG. 4, the wireless communication repeater 10 includes a communication bus 18. The communication bus 18 is connected to a control circuit 20 and a memory 22. The memory 22 stores a control program and management information. The control circuit 20 includes a processor and is implemented by the processor performing processing according to the above control program by using the above management information and the like. The control program can be provided via a computer-readable recording medium and can also be provided via a network.

The communication bus 18 is also connected to a wired communication module 24 and a drive circuit 26. The wireless communication repeater 10 can establish wired communication with an external device via the wired communication module 24. The drive circuit 26 includes a storage medium for storing various types of data.

The communication bus 18 is also connected to a user interface 28 and a timer 30. The user interface 28 is used for various input operations and the like to the wireless communication repeater 10. The timer 30 is used for various kinds of counting required for performing communication.

The communication bus 18 is further connected to the NIC-1 and the NIC-2 also shown in FIG. 3. As described above, the NIC-1 is a wireless communication module for establishing wireless communication between the wireless communication repeater 10 and the master device 14. Meanwhile, the NIC-2 is a wireless communication module for establishing wireless communication between the wireless communication repeater 10 and the slave device 16.

Both the NIC-1 and the NIC-2 can switch and use a plurality of channels in response to a command issued from the control circuit 20. For example, in a case where the wireless communication system of the present embodiment uses the 920 MHz band in Japan, the wireless communication system can appropriately switch and use a plurality of channels that can be set according to the division of FIG. 2. Specifically, for example, in a case where being requested by the control circuit 20 to use the width of 1 MHz from the sub ch 24 to the sub ch 28, the NIC-1 and the NIC-2 use the region as a single channel. Further, in a case where it is required to use the width of 4 MHz from the sub ch 34 to the sub ch 53, a region thereof is used as a single channel. The NIC-1 and the NIC-2 can transition the using channel at a timing specified by the control circuit 20.

Figure 5:
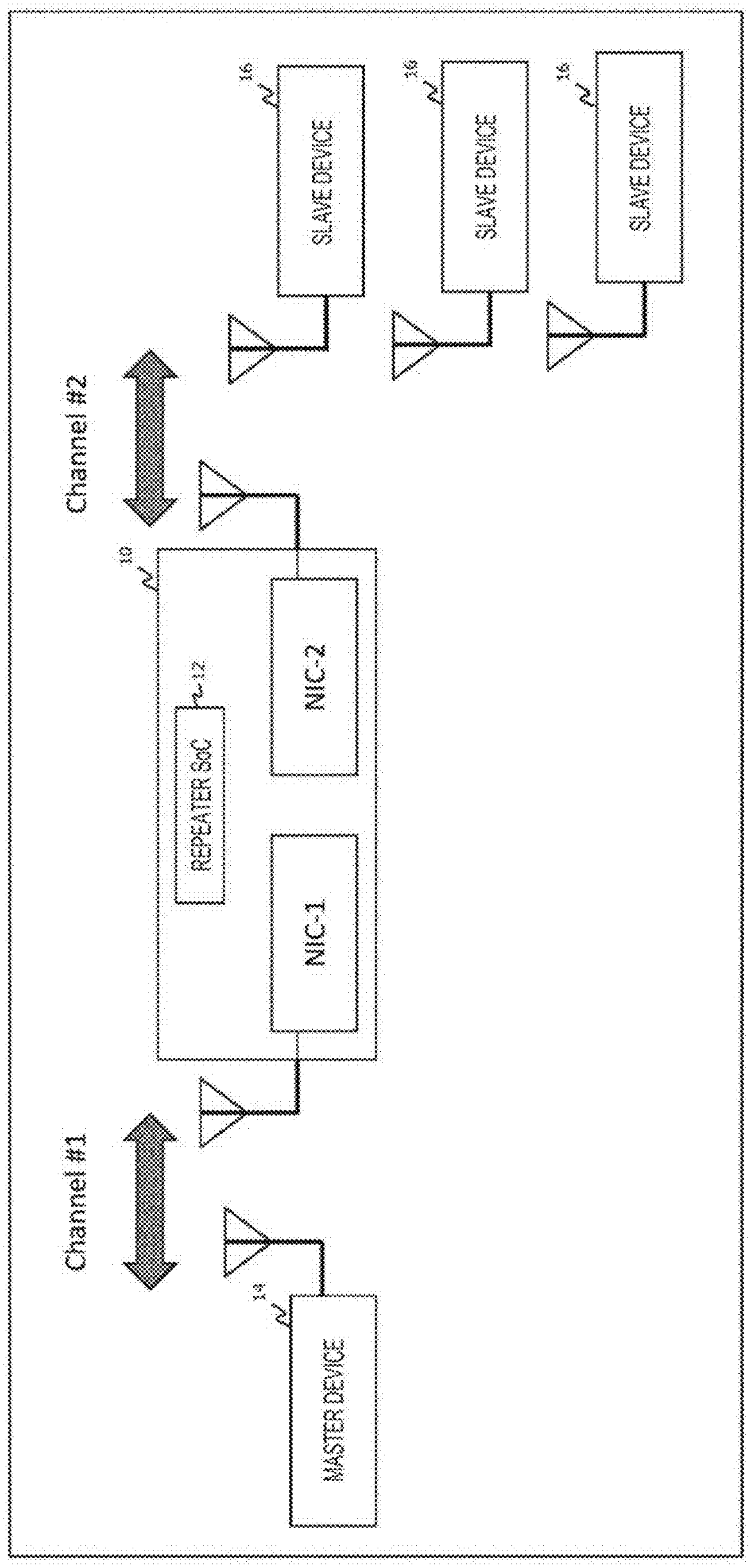
FIG. 5 shows a state in which two communication groups are simultaneously performing communication in the wireless communication system of FIG. 3.

FIG. 5 shows a state in which a first communication group including the NIC-1 and the master device 14 and a second communication group including the NIC-2 and the slave devices 16 are simultaneously performing wireless communication. In FIG. 5, the first communication group uses a channel #1, and the second communication group uses a channel #2. The channel #1 and the channel #2 are independent channels having no frequency overlapping area.

A command issued from the control circuit 20 of the repeater SoC 12 to the NIC-1 is also given from the NIC-1 to the master device 14 belonging to the same communication group. Therefore, the NIC-1 and the master device 14 can perform wireless communication through a channel conforming to the command of the control circuit 20. Similarly, a command issued from the control circuit 20 to the NIC-2 is transmitted to all the slave devices 16 belonging to the same communication group as the NIC-2. Therefore, the NIC-2 and all the slave devices 16 can perform wireless communication through a channel conforming to the command of the control circuit 20.

Feature of First Embodiment

Figure 6:
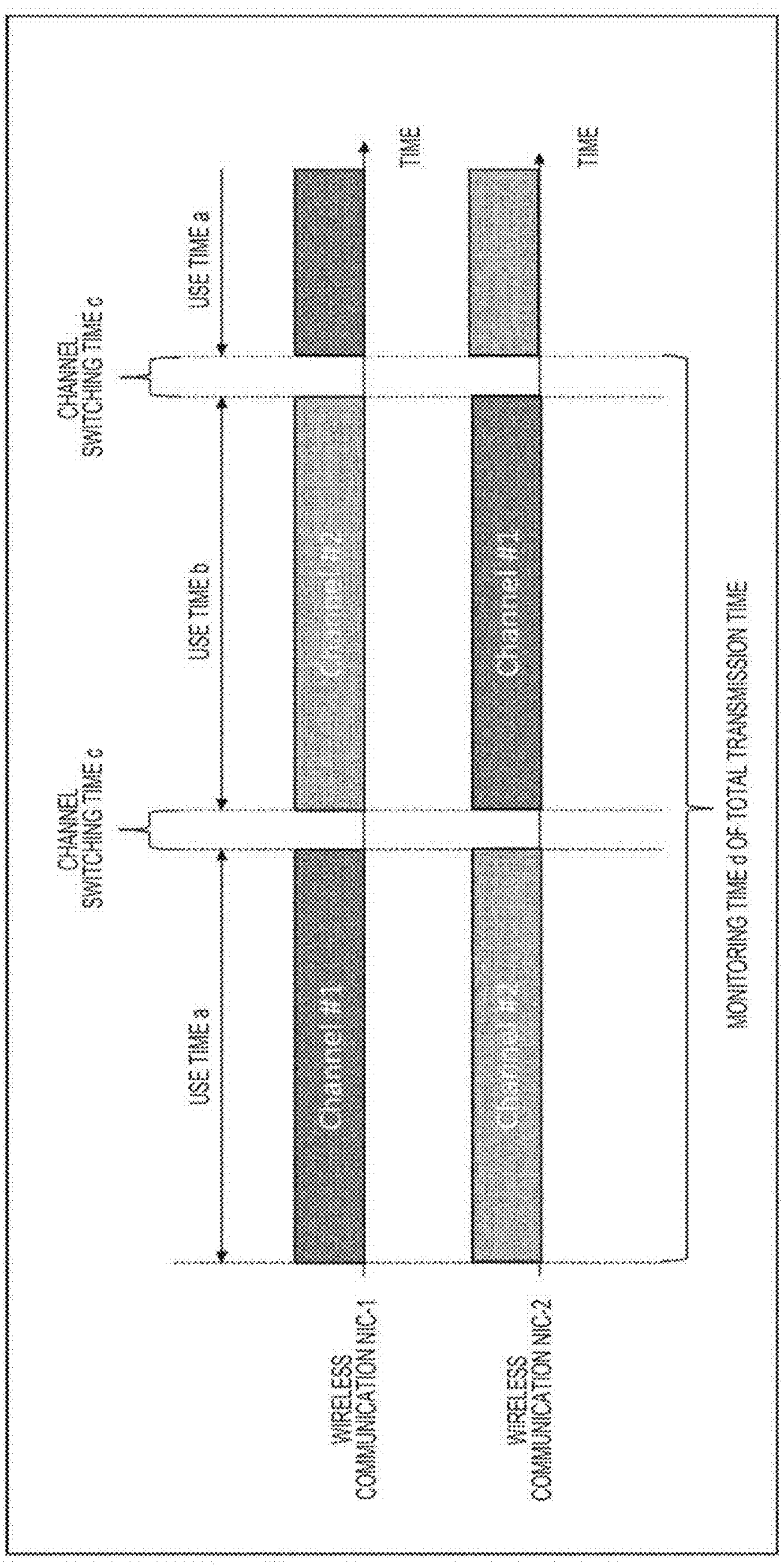
FIG. 6 is a timing chart showing features of the wireless communication system in the first embodiment of the present disclosure.

FIG. 6 is a timing chart showing features of the wireless communication system of the present embodiment. FIG. 6 shows a state in which the NIC-1 uses the channel #1 during a use time a, and the NIC-2 uses the channel #2 during the same period. FIG. 6 also shows a state in which the NIC-1 uses the channel #2 during a use time b after a channel switching time c elapses, and the NIC-2 uses the channel #1 during the same period.

In order to implement an operation of FIG. 6, the control circuit 20 issues a command including the channel (#1, #2), the use time (a, b), the switching time c, and a start timing of a monitoring time d to the NIC-1 and the NIC-2. In response to the command, the NIC-1 sequentially performs the following processing.

(1-1) The NIC-1 starts communication using the channel #1 with the master device 14 at the start timing of the monitoring time d.

(1-2) The NIC-1 maintains the channel #1 until the use time (a) elapses.

(1-3) The NIC-1 monitors a total transmission time during the use time (a) and limits an amount of transmission packets such that the duty ratio does not exceed 10% in the monitoring time (d). That is, when the transmission time of the NIC-1 reaches "d/10" during the use time (a), the NIC-1 stops subsequent packet transmission.

(1-4) When the use time (a) has elapsed, the NIC-1 stops communication using the channel #1 and waits until the channel switching time c elapses.

(1-5) When the switching time (c) has elapsed, the NIC-1 resumes communication with the master device 14 through the channel #2.

(1-6) The NIC-1 monitors the total transmission time during the use time (b) and limits an amount of transmission packets such that the duty ratio does not exceed 10% in the monitoring time (d).

(1-7) When the use time b has elapsed, the NIC-1 stops communication using the channel #2 and waits until the channel switching time c elapses.

(1-8) Thereafter, the NIC-1 repeatedly performs the above processing in (1-1) to (1-7).

The NIC-2 that has received the above command from the control circuit 20 performs the following processing.

(2-1) At the start timing of the monitoring time (d), that is, in synchronization with the NIC-1 starting communication through the channel #1, the NIC-2 starts communication using the channel #2 with the slave devices 16.

(2-2) The NIC-2 maintains the channel #2 until the use time a elapses.

(2-3) The NIC-2 monitors a total transmission time during the use time (a) and limits an amount of transmission packets such that the duty ratio does not exceed 10% in the monitoring time (d).

(2-4) When the use time (a) has elapsed, the NIC-2 stops communication using the channel #2 and waits until the channel switching time c elapses.

(2-5) When the switching time (c) has elapsed, the NIC-2 resumes communication with the slave devices 16 through the channel #1.

(2-6) The NIC-2 monitors the total transmission time during the use time (b) and limits an amount of transmission packets such that the duty ratio to the monitoring time (d) does not exceed 10%.

(2-7) When the use time (b) has elapsed, the NIC-2 stops communication using the channel #1 and waits until the channel switching time c elapses.

(2-8) Thereafter, the NIC-2 repeatedly performs the above processing in (2-1) to (2-7).

The wireless communication system of the present embodiment is used in a frequency band on which a transmission limitation is imposed, such as the 920 MHz band in Japan. In the present embodiment, a limitation of the duty ratio of the total transmission time in the single channel to 10% or less is imposed on all the communication devices included in the system. Further, the upper limit of the duty ratio is allowed up to 20% on a condition of switching to a channel having no overlapping area. The above monitoring time (d) is a unit time for monitoring the duty ratio of transmission and is, for example, "one hour".

In a case where the channel #1 and the channel #2 have no overlapping area, the duty ratio of 10% can be given to the NIC-1 in each channel by the above processing in (1-1) to (1-8). That is, the duty ratio of up to 20% can be given to the NIC-1. Similarly, in a case where the channel #1 and the channel #2 have no overlapping area, the duty ratio of up to 20% can also be given to the NIC-2 by the above processing in (2-1) to (2-8).

In the example of FIG. 6, the NIC-1 and the NIC-2 switch channels at the same timing. Therefore, a period during which the NIC-1 uses the channel #1 and a period during which the NIC-2 uses the channel #1 do not overlap. The same applies to the channel #2. Therefore, according to the operation example of FIG. 6, if only two independent channels having no overlapping area can be prepared, signal interference between the first communication group and the second communication group can be avoided in all periods.

Taking the 920 MHz band in Japan as an example, it is necessary to set each channel width to 1 MHz in order to prepare four independent channels, as described with reference to FIG. 2. Meanwhile, in a case where two independent channels are sufficient, each channel width can be set to 2 MHz. Therefore, in the present embodiment, the control circuit 20 issues a command in which the width of 2 MHz is allocated to each of the channels #1 and #2 to the NIC-1 and the NIC-2.

As a result, the wireless communication system of the present embodiment can utilize a wide frequency domain of 4 MHz in total during the use times (a) and (b). In a case where the NIC-1 and the NIC-2 independently switch channels, a domain width that can be simultaneously used is 2 MHz, and thus, the system of the present embodiment greatly improves frequency utilization efficiency. When the frequency utilization efficiency is improved, the communication capacity is also expanded. Therefore, according to the present embodiment, the communication capacity of the entire system can be greatly expanded.

Second Embodiment

Configuration of Second Embodiment

Next, a second embodiment of the present disclosure will be described with reference to FIG. 7 together with FIGS. 2 to 5.

A wireless communication system of the present embodiment can be implemented by the hardware configuration shown in FIGS. 3 and 4 as in the first embodiment. Also in the present embodiment, as shown in FIG. 5, the first communication group including the NIC-1 and the master device 14 and the second communication group including the NIC-2 and the slave devices 16 simultaneously communicate by using channels that do not interfere with each other.

In the above first embodiment, the first communication group and the second communication group perform communication by using the channels #1 and #2 each having the width of 2 MHz. In the 920 MHz band in Japan, there is only one 4 MHz wide channel that can be prepared without generating an overlapping area. Therefore, in a method of switching and using a plurality of channels having the width of 4 MHz, an overlapping area is inevitably generated, and thus the maximum duty of transmission is 10%. Further, interference also occurs between the two communication groups, a retransmission request is generated, and thus it is considered that it is difficult to secure a sufficient capacity. For the above reasons, operation of switching and using two independent channels having the width of 2 MHz is useful for increasing the frequency utilization efficiency.

Figure 1:
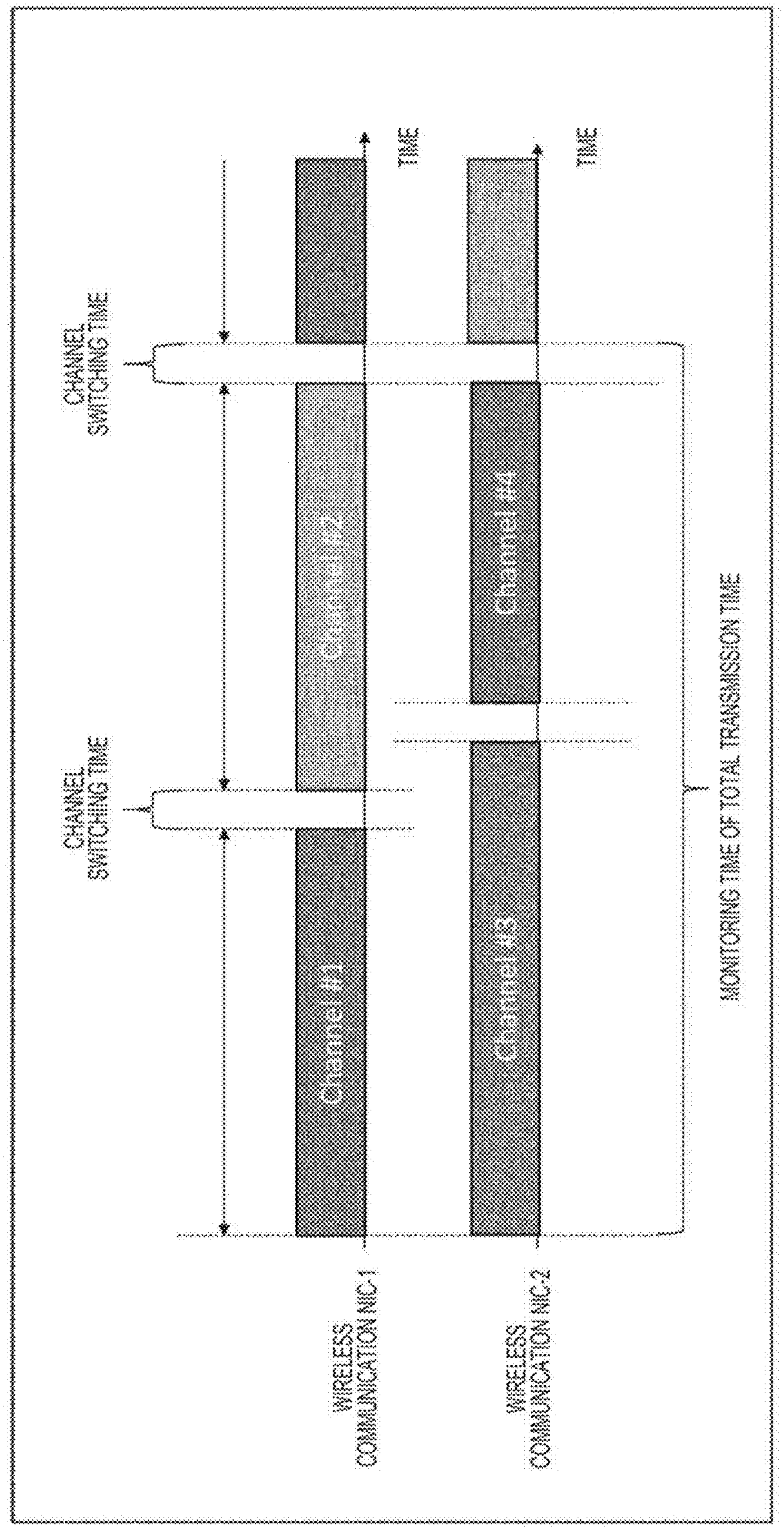
FIG. 1 is a timing chart showing a state in which two wireless communication modules NIC-1 and NIC-2 appropriately switch channels.
Figure 2:
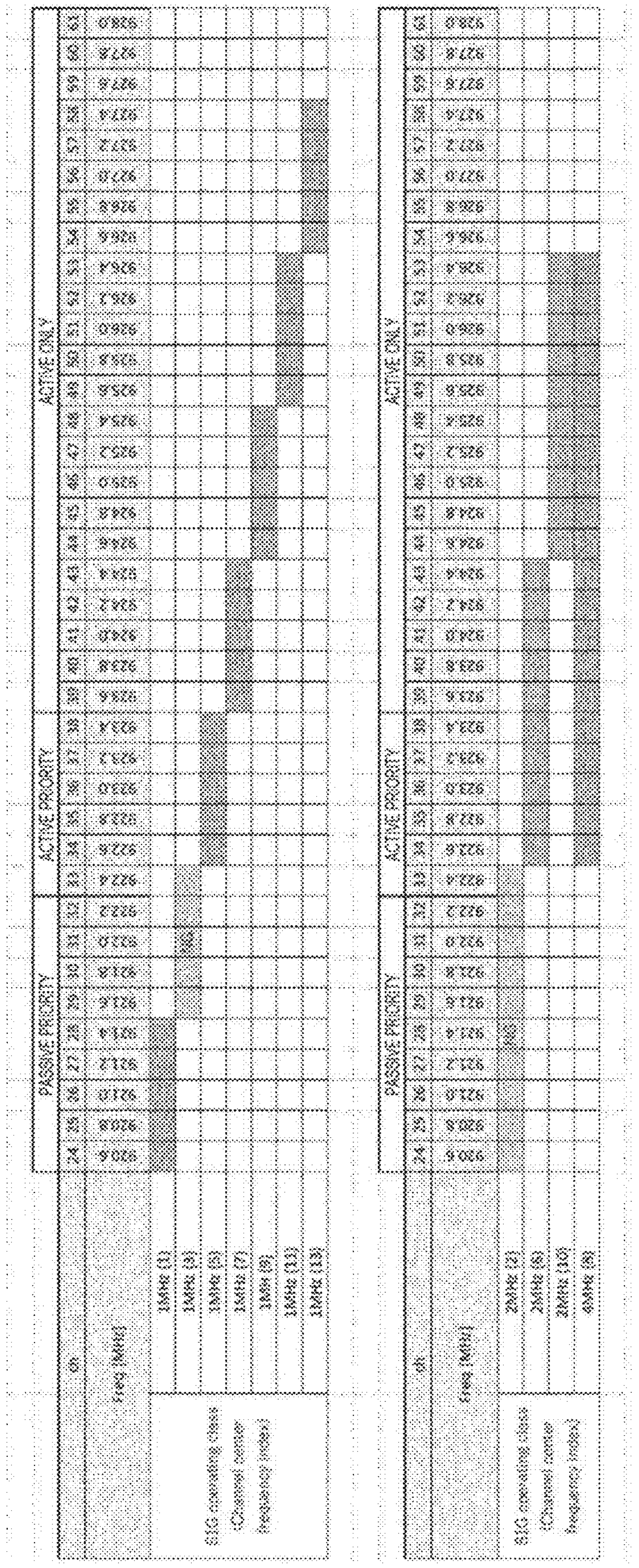
FIG. 2 shows an example where channels are set according to division of the 920 MHz band in Japan.

However, in the division of FIG. 2, two channels having no overlapping area can be prepared by combining a channel having the width of 4 MHz and a channel having the width of 1 MHz. Thus, if the NIC-1 and the NIC-2 are requested to switch and use those channels, the region of 5 MHz in total can be simultaneously used. This makes it possible to achieve wider frequency utilization, as compared with the first embodiment.

Features of Second Embodiment

Figure 7:
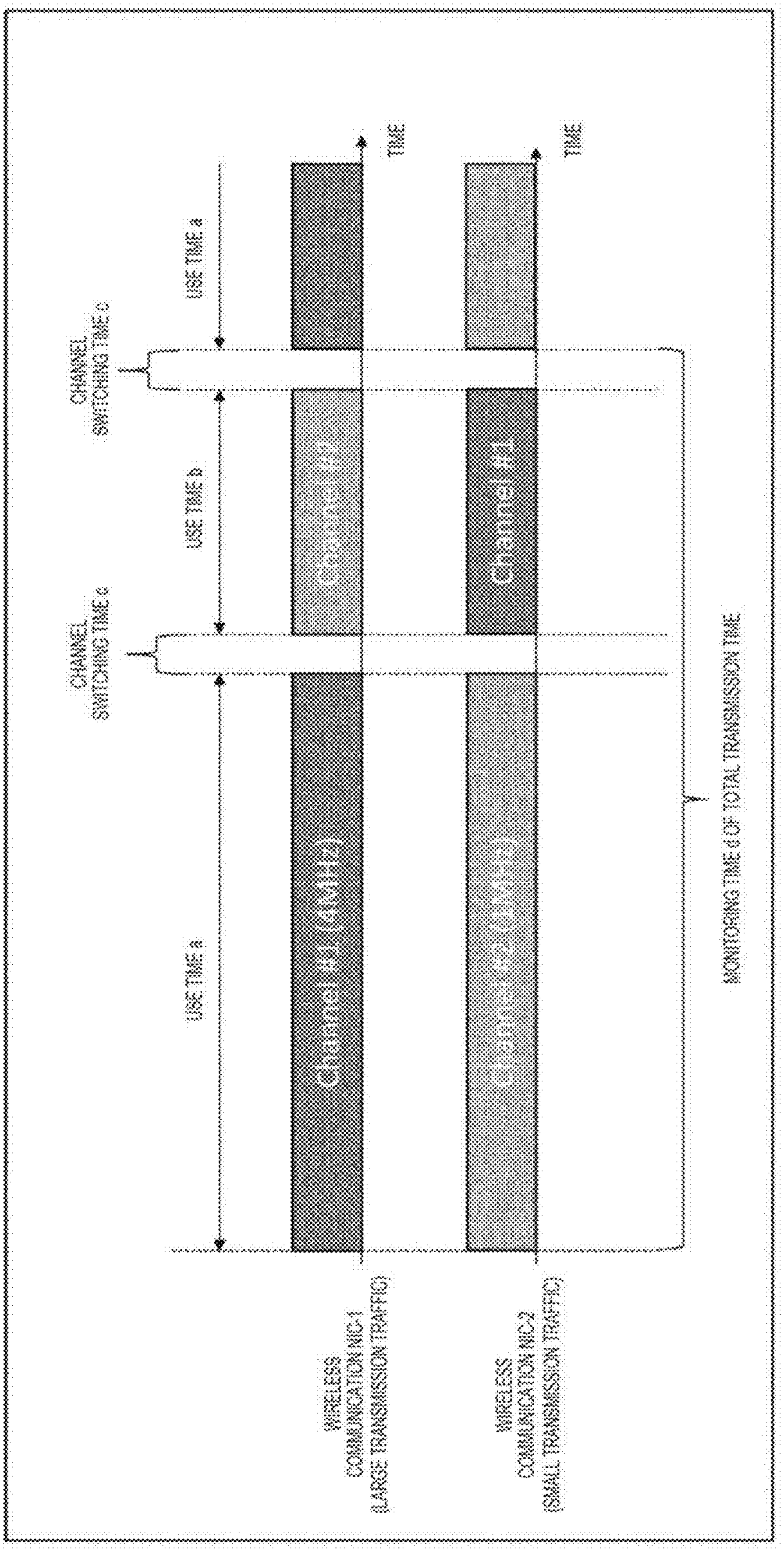
FIG. 7 is a timing chart showing features of a wireless communication system in a second embodiment of the present disclosure.

FIG. 7 shows an example of a timing chart in a case where the NIC-1 and the NIC-2 switch and use the channel #1 having the width of 4 MHz and the channel #2 having the width of 1 MHz. In the present embodiment, the wireless communication repeater 10 causes the NIC-1 and the NIC-2 to switch the channels #1 and #2 so as to implement the state of FIG. 7. Therefore, the frequency utilization efficiency is further improved in the present embodiment, as compared with the first embodiment.

In the wireless communication system of the present embodiment, the NIC-2 may communicate with a plurality of slave devices 16. Each of the plurality of slave devices 16 can perform transmission at the duty ratio of 10%. The same limitation is also imposed on the transmission from the NIC-1 to the master device 14, and thus, in a case where the two communication groups have the same transmission rate, the amount of packets received by the NIC-2 is larger than the amount of packets transmitted by the NIC-1. Therefore, packet congestion tends to occur in the NIC-1 in this system.

In the present embodiment, during the use time (a), the NIC-1 uses the 4 MHz band, and the NIC-2 uses the channel #2 of 1 MHz as described above. In this case, the used band is four times, and thus a transmission rate r1_1 of the NIC-1 is sufficiently larger than a transmission rate r2_2 of the NIC-2. That is, during the use time (a), the plurality of slave devices 16 uploads packets to the NIC-2 at the small transmission rate r2_2, whereas the NIC-1 uploads packets to the master device 14 at the large transmission rate r1_1. In this case, packet congestion is unlikely to occur in the wireless communication repeater 10.

In the present embodiment, as shown in FIG. 7, the use time (a) in which 4 MHz is allocated to the NIC-1 is secured longer than the use time (b) in which 1 MHz is allocated to the NIC-1. According to this setting, it is possible to maintain a state in which congestion is unlikely to occur for a long time for the above reason during the monitoring time (d).

A phenomenon opposite to the above occurs during the use time (b), and thus packet congestion tends to occur in the wireless communication repeater 10. However, regardless of the length of the use time (b), the NIC-1 is allowed to perform transmission through a single channel with the upper limit of 10% of the monitoring time (d). If the use time (b) is d/10, the NIC-1 can continue transmission through the channel #2 during the use time (b) after the channel is switched. That is, in a case where the use time (b) is set shorter than the use time (a), (transmission ratio of NIC-1)=(transmission time of NIC-1)/(use time b) in the use time (b) can be set to a high value.

During the use time (b), the upload from the slave devices 16 to the NIC-2 is performed by using a wide band of 4 MHz, but the transmission is not continuously performed. Therefore, in a case where the (transmission ratio of the NIC-1) has a high value, packet congestion in the wireless communication repeater 10 can be suppressed also during the use time (b).

As described above, in the present embodiment, the simultaneously usable band can be set to 5 MHz by combining the channel #1 of 4 MHz and the channel #2 of 1 MHz, and thus it is possible to further increase the frequency utilization efficiency, as compared with the first embodiment. Further, when the use time (a) is set longer than the use time (b), it is possible to effectively avoid occurrence of congestion in the wireless communication repeater 10 in an environment in which the two wireless communication modules NIC-1 and NIC-2 have unbalanced loads.

[Setting of Use Time (a) and (b)]

In a case where the channel #1 of 4 MHz and the channel #2 of 1 MHz are switched and used as described above, a user may feel a change in communication quality as a bodily sensation when the channel is switched. In the present embodiment, in order to suppress such a change in bodily sensation, the use times (a) and (b) are specifically set by the following calculation such that the upper limit or average value of the transmission rate is constant between the channel #1 and the channel #2.

Here, parameters used to calculate the use times (a) and (b) are defined again.

The transmission rate at which the NIC-1 can perform transmission through the channel #1 (4 MHz): r1_1

A transmission rate at which the NIC-1 can perform transmission through the channel #2 (1 MHz): r1_2

An amount of data that can be transmitted through the channel #1 at the duty ratio of 10%:d1 [byte]

An amount of data that can be transmitted through the channel #2 at the duty ratio of 10%:d2 [byte]

In order to obtain the maximum rate in the NIC-1, it is necessary to transmit the amount of data of d1 during the use time (a) and to transmit the amount of data of d2 during the use time (b). In this case, the transmission rates r1_1 and r1_2 to be secured in the respective channels are as follows.

$$\mathrm{r1\_1} = d1/a \tag{1}$$

$$\mathrm{r1\_2} = d2/a \tag{2}$$

In order to keep the transmission rate of the NIC-1 constant before and after switching the channel, it is necessary to establish a relationship of the following equation.

$$\mathrm{r1\_1} = \mathrm{r1\_2} \tag{3}$$

When the relationship of the above equation (3) is applied to the above equations (1) and (2), a relationship of the following equation holds.

$$d1/a = d2/b \tag{4}$$

From the above equation (4), a relationship between a and b is as follows.

$$a = d1/d2 * b \tag{5}$$

The use time (a) and the use time (b) have the following relationship with the monitoring time (d) and the channel switching time (c).

$$d = a + b + c \quad (6)$$

In the present embodiment, the use times (a) and (b) are set so as to satisfy the above equations (5) and (6). Therefore, the wireless communication system of the present embodiment can efficiently utilize a wide frequency band, suppress congestion in the wireless communication repeater 10, and sufficiently prevent the user from feeling a change in communication quality.

REFERENCE SIGNS LIST

10 Wireless communication repeater
12 Repeater SoC (system on chip)
14 Master device
16 Slave device
20 Control circuit
22 Memory
NIC-1, NIC-2 Wireless communication module (network interface card or network interface controller)

The invention claimed is:

1. A wireless communication device circuitry comprising:
- a first wireless communication module circuitry that performs wireless communication with a communication device circuitry belonging to a first communication group while switching a plurality of channels having no frequency overlapping area;
- a second wireless communication module circuitry that performs wireless communication with a communication device circuitry belonging to a second communication group while switching a plurality of channels having no frequency overlapping area; and
- control circuitry that issues a command to specify a channel to be used for communication and a channel switching timing to the first wireless communication module circuitry and the second wireless communication module circuitry, wherein
- the first wireless communication module circuitry and the second wireless communication module circuitry are configured to perform
- relaying a packet between the communication device circuitry belonging to the first communication group and the communication device circuitry belonging to the second communication group, and
- perform, in response to the command,
- switching the channels in synchronization with each other, and
- selecting channels to be used for communication such that channels to be simultaneously used have no overlapping area.

2. The wireless communication device circuitry according to claim 1, wherein:
- the first wireless communication module circuitry and the second wireless communication module circuitry are configured further to perform
- monitoring a transmission time for each channel to be used for communication, and
- when the transmission time reaches a time limit for a single channel, stopping subsequent transmission through the channel.

3. The wireless communication device circuitry according to claim 2, wherein
- said wireless communication device circuitry is used in an environment in which
- a single wireless device circuitry is subject to a restriction on the time transmitting data through a single channel, and is newly allowed to transmit data within the restriction when the channel is switched.

4. The wireless communication device circuitry according to claim 1, wherein:
- the plurality of channels includes a first channel and a second channel; and
- the first channel and the second channel each have a frequency band having a same width.

5. The wireless communication device circuitry according to claim 1, wherein:
- the plurality of channels includes a first channel and a second channel; and
- the first channel has a wider frequency band than the second channel.

6. The wireless communication device circuitry according to claim 5, wherein:
- packet congestion is more likely to occur in the first wireless communication module circuitry than in the second wireless communication module circuitry; and
- a first use time during which the first wireless communication module circuitry uses the first channel is set longer than a second use time during which the first wireless communication module circuitry uses the second channel.

7. A wireless communication method of causing a wireless communication device circuitry to relay communication between a communication device circuitry belonging to a first communication group and a communication device circuitry belonging to a second communication group, wherein:
- the wireless communication device circuitry includes:
- a first wireless communication module circuitry that performs wireless communication with the communication device circuitry belonging to the first communication group while switching a plurality of channels having no frequency overlapping area;
- a second wireless communication module circuitry that performs wireless communication with the communication device circuitry belonging to the second communication group while switching a plurality of channels having no frequency overlapping area; and
- a control circuitry that issues a command to specify a channel to be used for communication and a channel switching timing to the first wireless communication module circuitry and the second wireless communication module circuitry; and
- the first wireless communication module circuitry and the second wireless communication module circuitry perform:
- relaying a packet between the communication device circuitry belonging to the first communication group and the communication device circuitry belonging to the second communication group;
- in response to the command, switching the channels in synchronization with each other; and
- in response to the command, selecting channels to be used for communication such that channels to be simultaneously used have no overlapping area.

8. A wireless communication system including a communication device circuitry belonging to a first communication group, a communication device circuitry belonging to a second communication group, and a wireless communication device circuitry that relays communication between the communication device circuitry, wherein the wireless communication device circuitry includes:

a first wireless communication module circuitry that performs wireless communication with the communication device circuitry belonging to the first communication group while switching a plurality of channels having no frequency overlapping area;

a second wireless communication module circuitry that performs wireless communication with the communication device circuitry belonging to the second communication group while switching a plurality of channels having no frequency overlapping area; and a control circuitry that issues a command to specify a channel to be used for communication and a channel switching timing to the first wireless communication module circuitry and the second wireless communication module circuitry, and wherein the first wireless communication module circuitry and the second wireless communication module circuitry are configured to perform:

relaying a packet between the communication device circuitry belonging to the first communication group and the communication device circuitry belonging to the second communication group, and in response to the command, switching the channels in synchronization with each other, and selecting channels to be used for communication such that channels to be simultaneously used have no overlapping area.

* * * * *